(12) United States Patent
Kismarton (10) Patent No.: US 9,592,650 B2
(45) Date of Patent: *Mar. 14, 2017

(54) COMPOSITE LAMINATE INCLUDING BETA-REINFORCING FIBERS

(71) Applicant: The Boeing Company, Chicago, IL (US)

(72) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 294 days.

This patent is subject to a terminal disclaimer.

(21) Appl. No.: 14/252,764

(22) Filed: Apr. 14, 2014

(65) Prior Publication Data

US 2014/0227479 A1    Aug. 14, 2014

Related U.S. Application Data

(63) Continuation of application No. 12/897,742, filed on Oct. 4, 2010, now Pat. No. 8,720,825, which is a (Continued)

(51) Int. Cl.
*B64C 1/00* (2006.01)
*B32B 5/12* (2006.01)
(Continued)

(52) U.S. Cl.
CPC ............. *B32B 5/12* (2013.01); *B29C 65/562* (2013.01); *B29C 65/564* (2013.01); (Continued)

(58) Field of Classification Search
CPC ..... B32B 5/12; B64C 1/00; Y10T 428/24124; B29C 65/562; B29C 65/564; B29C 66/721; B29C 70/202; B29C 70/207; B29C 70/228; B29C 70/30; B29K 2101/00; B29K 2307/00; B29K 2707/04; B29L 2031/307

(Continued)

(56) References Cited

U.S. PATENT DOCUMENTS 4,177,306 A * 12/1979 Schulz ................. B29C 70/085
                                            428/107
4,310,132 A   1/1982 Frosch et al.
(Continued)

FOREIGN PATENT DOCUMENTS

EP    1707702 A2    4/2006
GB    2238977 A     6/1991

OTHER PUBLICATIONS

"Macomechanical analysis of laminate properties," ASM International, XP055137883, Dec. 2001.
(Continued)

*Primary Examiner* — Benjamin P Lee
(74) *Attorney, Agent, or Firm* — Miller, Matthias & Hull LLP (57) ABSTRACT

A composite laminate comprises a plurality of plies of reinforcing fibers. At least some of the plies have reinforcing fibers oriented at $\pm\alpha$ with respect to an axis of primary loading, where $\alpha$ is between 2 and 12 degrees. At least some of the plies have reinforcing fibers oriented at $\pm\beta$ with respect to the axis of primary loading, where $\beta$ is between 50 and 85 degrees.

20 Claims, 6 Drawing Sheets

Related U.S. Application Data continuation-in-part of application No. 11/118,594, filed on Apr. 28, 2005, now Pat. No. 8,444,087, and a continuation-in-part of application No. 12/340,631, filed on Dec. 19, 2008, now Pat. No. 7,807,249, which is a continuation-in-part of application No. 11/096,727, filed on Mar. 31, 2005, now abandoned.

(51) Int. Cl.

| | | |
|---|---|---|
| *B29C 65/56* | (2006.01) | |
| *B29C 65/00* | (2006.01) | |
| *B29C 70/20* | (2006.01) | |
| *B29C 70/22* | (2006.01) | |
| *B29C 70/30* | (2006.01) | |
| *B32B 1/00* | (2006.01) | |
| *B32B 5/26* | (2006.01) | |
| *B32B 5/28* | (2006.01) | |
| *B64C 1/06* | (2006.01) | |
| *B64C 1/12* | (2006.01) | |
| *B64C 3/18* | (2006.01) | |
| *B64C 3/26* | (2006.01) | |
| *B29K 101/00* | (2006.01) | |
| *B29K 307/00* | (2006.01) | |
| *B29K 707/04* | (2006.01) | |
| *B29L 31/30* | (2006.01) | |

(52) U.S. Cl.
CPC .......... *B29C 66/474* (2013.01); *B29C 66/524* (2013.01); *B29C 66/721* (2013.01); *B29C 66/72141* (2013.01); *B29C 70/202* (2013.01); *B29C 70/207* (2013.01); *B29C 70/228* (2013.01); *B29C 70/30* (2013.01); *B32B 1/00* (2013.01); *B32B 5/26* (2013.01); *B32B 5/28* (2013.01); *B64C 1/064* (2013.01); *B64C 1/12* (2013.01); *B64C 3/182* (2013.01); *B64C 3/26* (2013.01); *B29C 66/7212* (2013.01); *B29K 2101/00* (2013.01); *B29K 2307/00* (2013.01); *B29K 2707/04* (2013.01); *B29L 2031/3076* (2013.01); *B32B 2250/20* (2013.01); *B32B 2260/023* (2013.01); *B32B 2260/046* (2013.01); *B32B 2262/106* (2013.01); *B64C 2001/0072* (2013.01); *Y02T 50/433* (2013.01); *Y10T 428/24124* (2015.01)

(58) Field of Classification Search
USPC ... 244/129.1, 117 R, 119, 123.1, 123.8, 133, 244/132; 428/105, 107, 109, 113
See application file for complete search history.

(56) References Cited

U.S. PATENT DOCUMENTS

| | | | | |
|---|---|---|---|---|
| 4,331,495 | A | * | 5/1982 | Lackman .............. B29C 70/865 112/423 |
| 4,786,343 | A | * | 11/1988 | Hertzberg ............... B29C 65/48 112/423 |
| 4,811,540 | A | * | 3/1989 | Kallies .............. B29D 99/0014 244/123.3 |
| 4,966,802 | A | | 10/1990 | Hertzberg et al. |
| 5,242,267 | A | * | 9/1993 | Byrnes .................... B64C 27/48 416/134 A |
| 5,452,867 | A | * | 9/1995 | Grunwald ................. B64C 3/24 156/173 |
| 5,735,486 | A | * | 4/1998 | Piening ..................... B64C 3/20 244/124 |
| 5,794,402 | A | * | 8/1998 | Dumlao ................... B63B 3/48 14/73.1 |
| 6,320,118 | B1 | | 11/2001 | Pridham et al. |
| 6,405,978 | B1 | | 6/2002 | Dean |
| 6,641,893 | B1 | * | 11/2003 | Suresh .................... C03C 14/00 428/105 |
| 7,074,474 | B2 | * | 7/2006 | Toi ........................ B29C 70/443 244/119 |
| 8,205,567 | B2 | * | 6/2012 | Dunleavy ............. B29C 70/543 112/475.08 |
| 2004/0213952 | A1 | * | 10/2004 | Takemura ................ B29C 70/34 428/105 |
| 2006/0208135 | A1 | * | 9/2006 | Liguore ................. B29C 70/088 244/117 R |
| 2006/0222837 | A1 | | 10/2006 | Kismarton |
| 2006/0237588 | A1 | * | 10/2006 | Kismarton .............. B64C 1/065 244/119 |
| 2006/0243860 | A1 | * | 11/2006 | Kismarton .............. B29C 65/562 244/132 |
| 2006/0249626 | A1 | * | 11/2006 | Simpson ................... B64C 3/20 244/123.1 |
| 2009/0104398 | A1 | | 4/2009 | Kismarton |
| 2010/0219294 | A1 | | 9/2010 | Kismarton |
| 2010/0320319 | A1 | * | 12/2010 | Liguore ................. B29C 70/088 244/119 |
| 2010/0320320 | A1 | * | 12/2010 | Kismarton .............. B29C 43/24 244/119 |

OTHER PUBLICATIONS

Daniel Gay, "Materiaux composites," Hermes, Paris 286601, XP 002395791, 1997.

\* cited by examiner

COMPOSITE LAMINATE INCLUDING BETA-REINFORCING FIBERS

This is a continuation of copending U.S. Ser. No. 12/897,742 filed 4 Oct. 2010. U.S. Ser. No. 12/897,742 is a continuation-in-part of U.S. Ser. No. 11/118,594 filed 28 Apr. 2005 (now U.S. Pat. No. 8,444,087) and also U.S. Ser. No. 12/340,631 filed 19 Dec. 2008 (now U.S. Pat. No. 7,807,249). U.S. Ser. No. 12/340,631 is a continuation-in-part of U.S. Ser. No. 11/096,727 filed 31 Mar. 2005 (now abandoned).

BACKGROUND

Stringers perform several functions in an aircraft. These functions include transferring bending loads in skin panels, and stiffening the skin panels so the panels don't buckle under loading.

The stringers and skin panels may be made of fiber composites such as carbon fiber reinforced plastic (CFRP). CFRP is being used in place of metal, especially in applications where relatively low weight and high mechanical strength are desirable. CFRP provides a significant improvement in specific strength and stiffness over conventional metal alloys. Better specific strength and stiffness translates into weight savings, which translates into fuel savings and lower operating costs.

A composite stringer is fabricated from multiple plies of reinforcing fibers. Some plies have reinforcing fibers oriented at 0 degrees with respect to the stringer's axis of primary loading. These fibers transfer uniaxial loads. Other plies have reinforcing fibers oriented at ±45 degrees and 90 degrees to transfer shear, transverse and bearing loads. Each ply adds weight to a stringer.

It would be desirable to increase the specific strength and stiffness of composite stringers.

SUMMARY

According to an embodiment herein, a composite laminate comprises a plurality of plies of reinforcing fibers. At least some of the plies have reinforcing fibers oriented at $\pm\alpha$ with respect to an axis of primary loading, where $\alpha$ is between 2 and 12 degrees. At least some of the plies have reinforcing fibers oriented at $\pm\beta$ with respect to the axis of primary loading, where $\beta$ is between 50 and 85 degrees.

According to another embodiment herein, a composite beam comprises plies of $\alpha$-reinforcing fibers oriented at $\pm\alpha$ with respect to an axis of primary loading, where $\alpha$ is between 2 and 12 degrees; and plies having $\beta$-reinforcing fibers oriented at $\pm\beta$ with respect to the axis of primary loading, where $\beta$ is between 50 and 85 degrees.

According to another embodiment herein, a system comprises a beam including a base and a web. The web includes plies of reinforcing fibers for providing strength in tension and compression along an axis of primary loading. The web also includes plies of reinforcing fibers oriented at $\pm\beta$ degrees with respect to the axis of primary loading, where $\beta$ is between 50 and 85 degrees. The fibers oriented at $\pm\beta$ degrees are biased towards outer surfaces of the web to increase stiffness in buckling and transverse loading.

DETAILED DESCRIPTION

Figure 1:
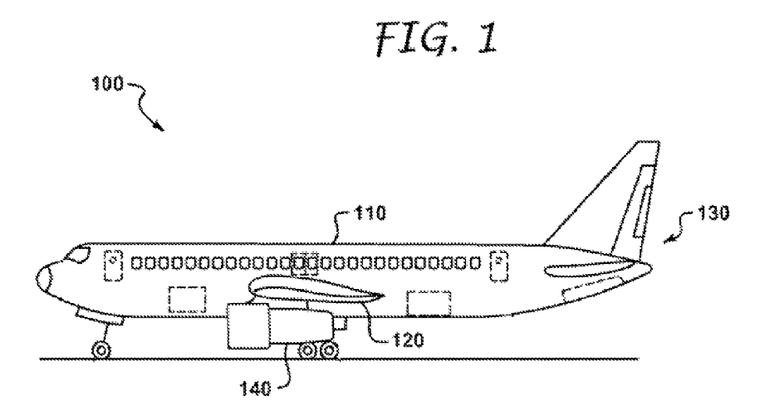
FIG. 1 is an illustration of a commercial aircraft.
Figure 2:
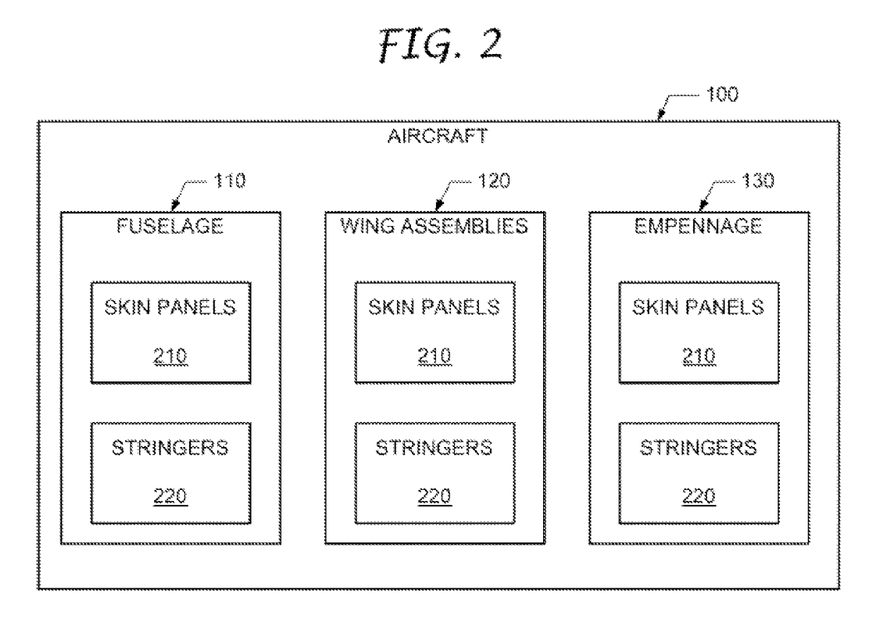
FIG. 2 is an illustration of major aircraft assemblies that include stringers.

Reference is made to FIGS. 1 and 2, which illustrate a commercial aircraft 100. Major assemblies of the aircraft 100 include a fuselage 110, wing assemblies 120, and empennage 130. One or more propulsion units 140 are coupled to the wing assemblies 120, or fuselage 110 or other portions of the aircraft 100.

The major aircraft assemblies 110, 120 and 130 include skin panels 210 and stiffeners. The stiffeners function to prevent the major assemblies 110, 120 and 130 from buckling, including transferring bending loads in the skin panels 210, and stiffening the skin panels 210 so the panels 210 don't buckle under loading. Stiffeners are not limited to the major aircraft assemblies 110, 120 and 130 illustrated in FIG. 2. Stiffeners may be used in any aircraft structures that require stiffening.

As described herein, a stringer 220 is a type of stiffener.
The stringers 220 in the fuselage 110 are subject primarily to uniaxial tension and compression and out-of-plane buckling. The fuselage stringers 220 are also subject to secondary loads including shear and bearing loads.

Each wing assembly 120 includes upper and lower stringers 220. The upper stringers 220 are subject primarily to uniaxial compression, while the lower stringers 220 are subject primarily to uniaxial tension (the primary loading is sometimes reversed). The upper and lower stringers 220 are also subject to secondary loads including shear, bearing and transverse loads.

The empennage 130 includes horizontal and vertical stabilizers. The stringers 220 in the stabilizers are subject to the same primary and secondary loading as the wing assemblies 120.

A stringer 220 under compression will tend to twist, cripple and buckle. The stringer 220 provides strength against compression and tension and stability against twist, cripple and buckle.

Figure 3:
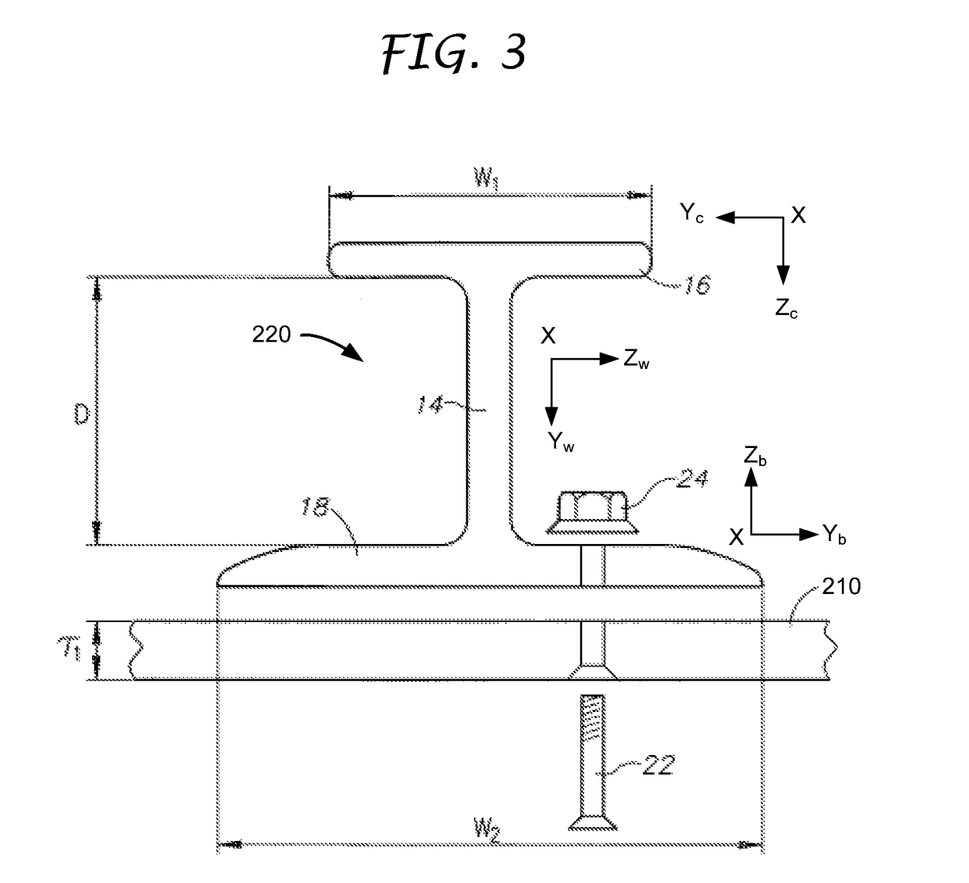
FIG. 3 is an illustration of a skin panel and stringer.

Reference is now made to FIG. 3, which illustrates an embodiment of a stringer 220 fastened to a skin panel 210. The stringer 220 of FIG. 3 has an I-beam geometry. Such a stringer 220 includes a web 14 between first and second flanges 16 and 18. The web 14 has a depth D that provides a desired resistance to an applied loading.

The first and second flanges 16 and 18 are generally planar members. The first flange 16, which will be referred to as a cap 16, has a width $W_1$. The second flange 18, will be referred to as a base 18, has a width $W_2$.

The web 14, cap 16 and base 18 extend in an X-direction along an X-axis (which is normal to the drawing sheet). The X-axis is the axis of primary loading. The web, cap 16 and base 18 may have constant widths along the X-direction, or they may vary continuously or even non-continuously along the X-direction.

FIG. 3 also shows a coordinate system for each of the web 14 (X-$Y_w$-$Z_w$), cap 16 (X-$Y_c$-$Z_c$), and base 18 (X-$Y_b$-$Z_b$). These coordinate systems may correspond to an I-beam formed by back-to-back C-channels. As discussed below, orientations of all reinforcing fibers are measured with respect to the X-direction.

Figure 4:
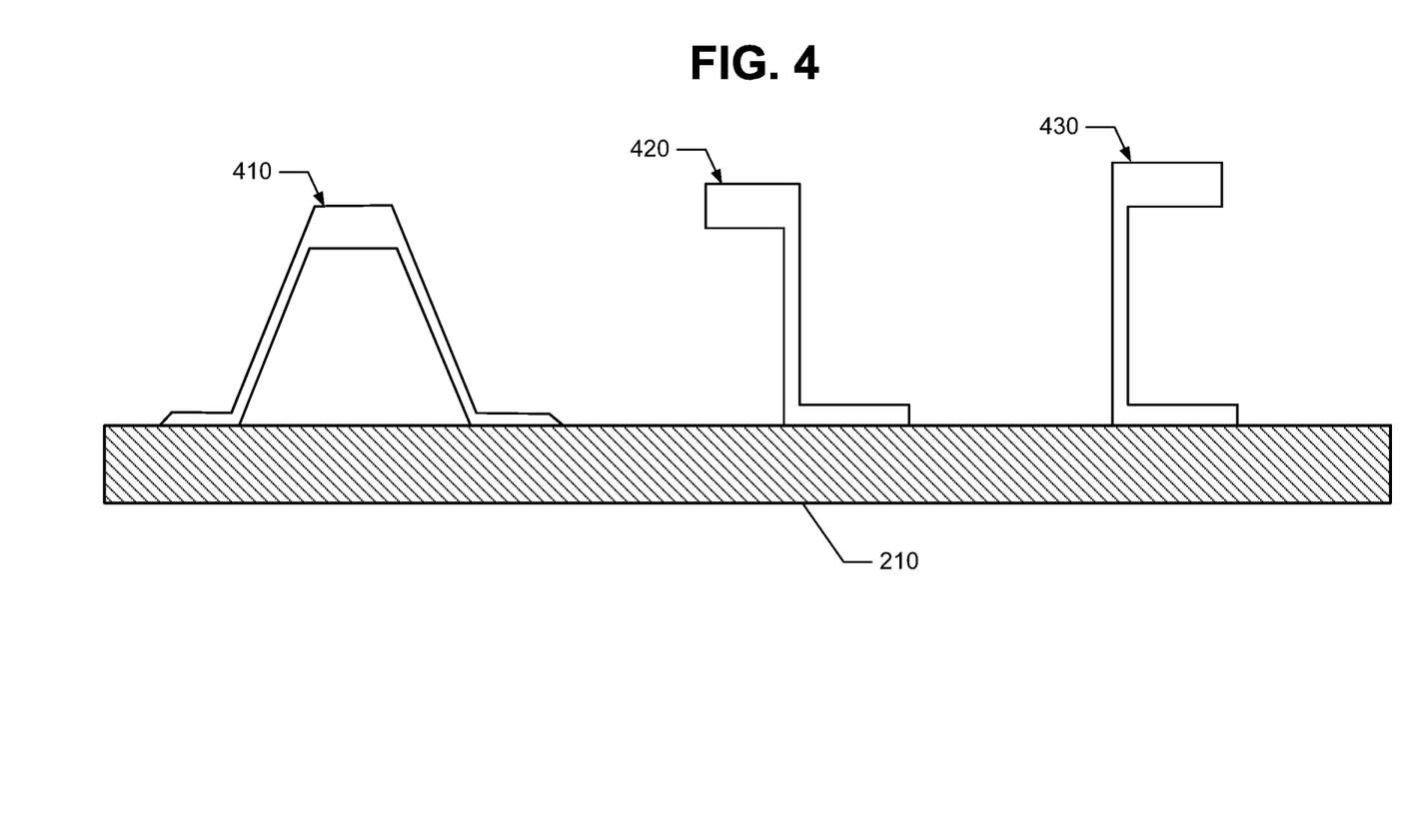
FIG. 4 is an illustration of different types of aircraft stringer geometries.

A stringer 220 herein is not limited to the I-beam geometry illustrated in FIG. 3. Other usable geometries include, but are not limited to, Z-beams, blades, C-channels, and hat beams. Stringers having these geometries all include at least one web and base. Examples of hat, Z-beam and C-Channel geometries 410, 420 and 430 are illustrated in FIG. 4.

The skin panel 210, which has a thickness $T_1$, is coupled to the base 18. In some embodiments, the base 18 may be adhesively bonded to the skin panel 210. In other embodiments, the base 18 may be co-cured with the skin panel 210.

In the embodiment shown in FIG. 3, the base 18 is clamped to the skin panel 210 by fasteners 22. The fasteners 22 extend through apertures in the skin panel 210 and the base 18. The fasteners 22 are engaged by nuts 24 to impart a predetermined compressive force to the skin panel 210 and the base 18. The fasteners 22 may be used instead of, or in addition to, the adhesive bonding.

Fasteners for clamping the stringers 220 to the skin panels 210 are not limited to bolts 22 and nuts 24. Other fasteners include, but are not limited to, staples, z-pins, rivets, swage fasteners, and barbs. Whereas fasteners such as bolts 22 extend entirely through a stringer base and skin panel 210, fasteners such as staples, z-pins and barbs may extend partially into the skin panels. Fasteners such as staples, z-pins and barbs may be integral with the stringer bases.

Another example of a fastener is stitching. Plies of fibers may be stitched together. Stitches can be threaded through apertures in a layup of dry composite plies. Resin is then infused in the structure, and the structure is cured.

The skin panel 210 includes a stack of plies of reinforcing fibers embedded in a matrix. Different plies may have fibers oriented at 0, +45, −45 and 90. Some embodiments may have a quasi isotropic layup, whereby equal amounts and percentages of 0, +45, −45, and 90 degree plies are used. In other embodiments, the different plies could include reinforcing fibers oriented at 10, −55, +100 and −35 degrees, or some other angles or combinations. The reinforcing fibers in the skin panels 210 may be carbon fibers having an intermediate modulus of 40 MSI. Ply stiffness of the skin panel 210 (i.e., stiffness of the carbon fibers plus resin) may have a modulus of 22-25 MSI. Stack stiffness along 0 degrees may be 10-12 MSI.

The stringer 220 includes multiples plies of reinforcing fibers embedded in a matrix. The reinforcing fibers and matrix are not limited to any particular composition. Examples for the fibers include, but are not limited to, carbon fibers, glass fibers, aramid fibers, boron fibers, and titanium fibers. Examples of the matrix include, but are not limited to, plastic and metal. As a first example, carbon fibers are embedded in a plastic matrix. As a second example, carbon fibers are embedded in a titanium matrix. In some embodiments, the carbon fibers may have an intermediate modulus of 40 MSI, and ply stiffness may be 22-25 MSI.

Figure 5A:
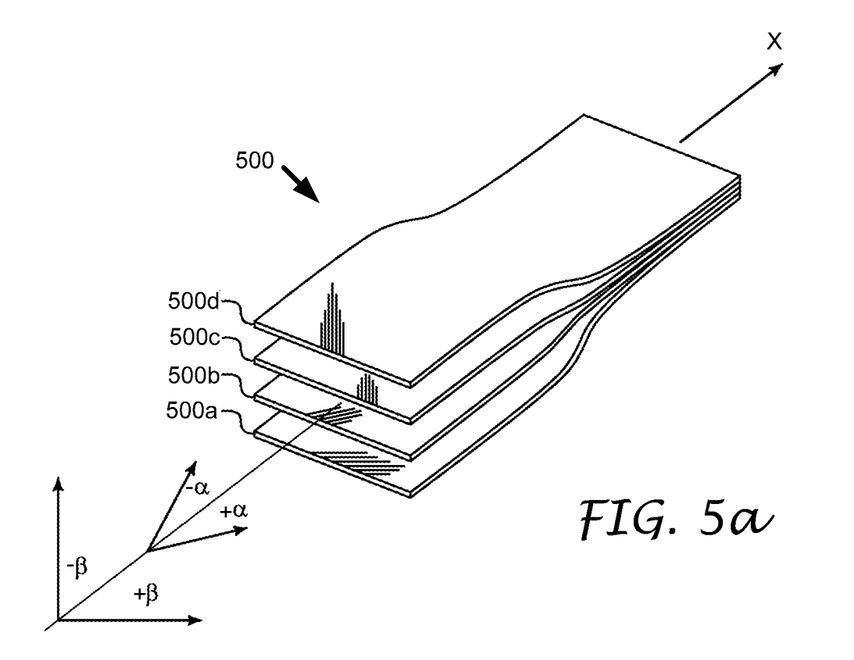
FIG. 5a is an illustration of a stack of plies of reinforcing fibers oriented at ±α degrees and ±β degrees.

Reference is now made to FIG. 5a, which illustrates a stack 500 of plies 500a-500d of a web 14, base 16 or cap of a stringer 220. The stack 500 illustrated in FIG. 5a includes first and second plies 500a and 500b having fibers oriented at +α degrees and −α degrees with respect to the X-axis. These fibers oriented at ±α provide strength in tension and compression along the X-axis.

The ply arrangement further includes third and fourth plies 500c and 500d having fibers oriented at +β degrees and −β degrees, where β is between 50 and 85 degrees (e.g., ±50, ±60, ±70, ±80). In some embodiments, the range for β will be narrower, between 50 and 75 degrees. Fibers oriented at ±β degrees boost shear, transverse and bearing strength. For instance, fibers oriented at ±β degrees can be added to boost bearing strength in areas where fasteners are used to make a fastened joint or repair a joint. Since fewer ±β plies are needed to achieve same transverse strength and bearing (that is, relative to fibers oriented at 90 degrees, +45 degrees and −45 degrees), the resulting structure is more usable, tailorable, efficient and lighter.

Selective fiber orientation allows any of six characteristics to be adjusted: strength in shear, stiffness in shear, strength in transverse, stiffness in transverse, bearing strength, and bearing stiffness. If greater strength in shear is desired, a β approaching 50 degrees will be selected. If greater strength in transverse is desired, a β approaching 85 degrees will be selected. If greater strength in bearing is desired, a β approaching 65-70 degrees will be selected.

Of the total fibers oriented at ±α and ±β, only 20-30% of the total fibers at ±β are needed to reach bearing strength levels similar to traditional 0/+45/−45/90 degree hard laminates. In a hard laminate, the percentage of zero degree plies is between 40 and 100%.

In some embodiments, plies of the fibers oriented at ±β degrees may be interspersed with plies of the fibers oriented at ±α degrees. Consider an example of unidirectional plies that are interspersed. The plies may have the following order: +α/−α/+β/+α/−α/−β/+α/−α/ . . . . The interspersed plies may be used in the web 14, cap 16 and 18. In other embodiments, however, the plies of β-fibers in the web 14 are biased towards the web's outer surfaces.

Figure 6:
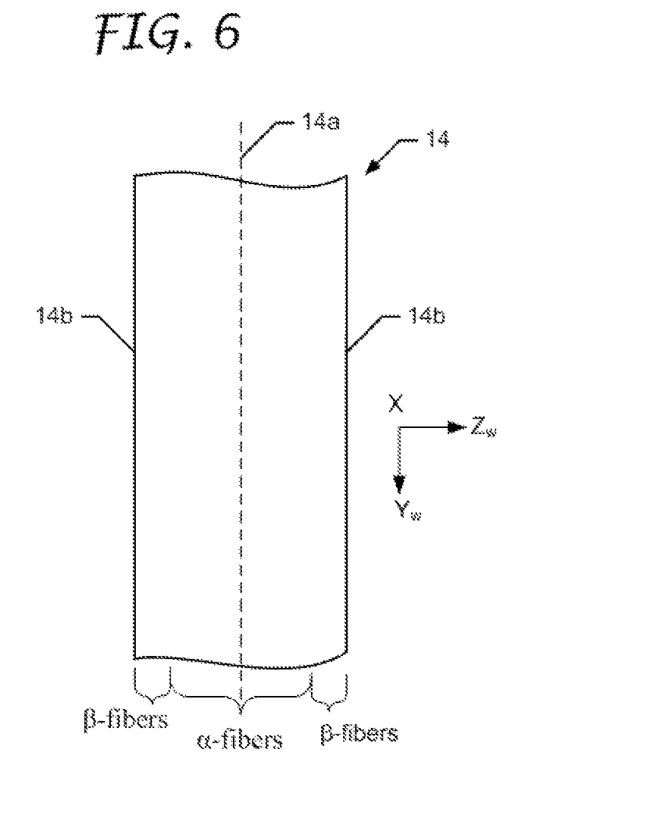
FIG. 6 is an illustration of a stringer web having β-fibers biased towards outer surfaces of the web.

Reference is made to FIG. 6, which illustrates a web 14 having plies of β-fibers biased away from the midplane 14a and biased towards the outer surfaces 14b. That is, the density of plies of β-fibers increases towards the outer surfaces 14b in the direction $Z_w$. For example, plies of α-fibers form a core of the web 14, and plies of β-fibers form the outer surfaces 14b of the web 14. Biasing the plies of β-fibers towards the outer surfaces 14b increases stiffness to buckling and transverse bending.

Although FIG. 5a illustrates only four plies 500a-500d of reinforcing fibers, a stringer 220 is not so limited. Additional plies of reinforcing fibers oriented at ±α degrees may be provided to increase strength in tension and compression along the axis L. Additional plies of reinforcing fibers oriented at other angles (later referred to as ±β) may be provided to increase at least one of shear, transverse, and bearing strength and/or stiffness.

Different arrangements may be grouped together. For example, a stringer may include a plurality of fiber groups. The plies in each group correspond to an arrangement of fibers at different orientations. The groups may be applied in any desired combination and may be repeated to any desired degree.

Preferably, at least 50% of the plies in the stack will have fibers oriented at ±α degrees. In some embodiments of stringers, however, 100% of the fibers will be oriented at ±α degrees.

Figure 5B:
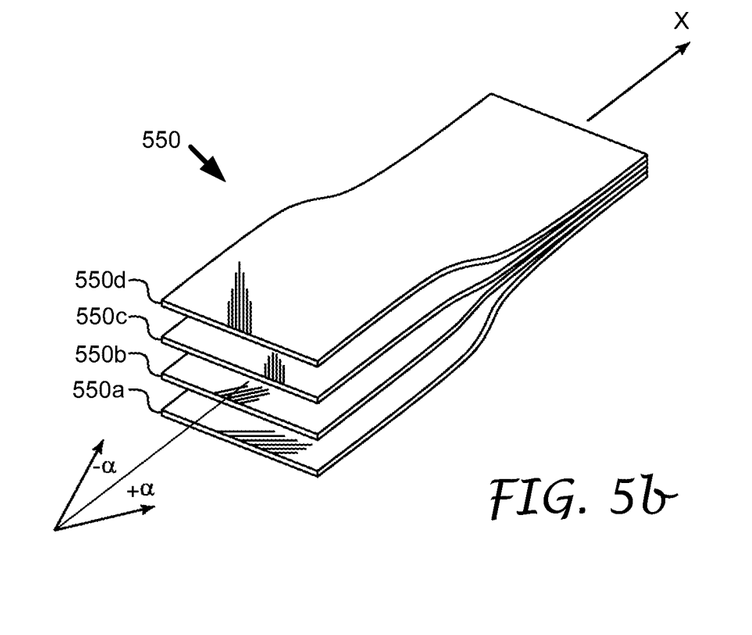
FIG. 5b is an illustration of a stack of plies of reinforcing fibers oriented only at ±α degrees.

FIG. 5b illustrates an embodiment of a stringer having plies of fibers oriented only at ±α with respect to the X-axis. In FIG. 5b, a stack 500 having four plies 550a-550d is illustrated.

In the stacks 500 and 550, the reinforcing fibers oriented at ±α degrees provide strength in tension and compression along the X-axis. Reinforcing fibers oriented at 0 degrees with respect to X-axis will provide maximum strength along the X-axis. Reinforcing fibers oriented at an angle α between 2 and 12 degrees with respect to the X-axis will not provide maximum strength, but they will suppress or delay ply splitting when the stringer 220 is loaded uniaxially along the X-axis (e.g., when the stringer is placed in uniaxial compression).

Fastener apertures may be perpendicular to the plies and extend through the plies that make up the base 18. The fibers oriented at α between 2 and 12 degrees can suppress or delay ply splitting that would otherwise be caused by these apertures extending through the base 18. The splitting of a ply will be suppressed or delayed by a factor of 10 to 100 times relative to a laminate having a majority of fibers oriented at α=0 degrees. Boosting the splitting resistance by 1 to 3 orders of magnitude makes such laminates far more practical.

Figure 7A:
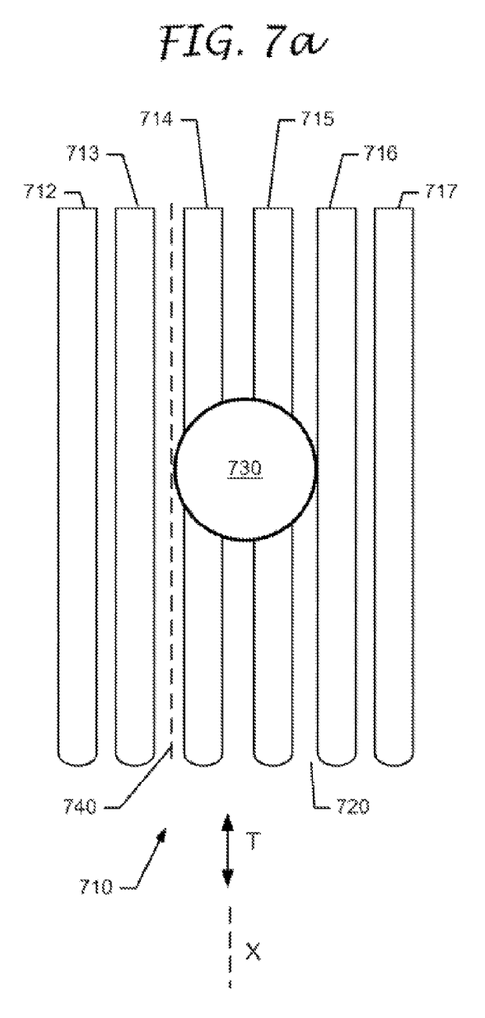
FIG. 7a is an illustration of reinforcing fibers oriented at 0 degrees with respect to an axis of primary loading of a stringer with a hole drilled in the middle.
Figure 7B:
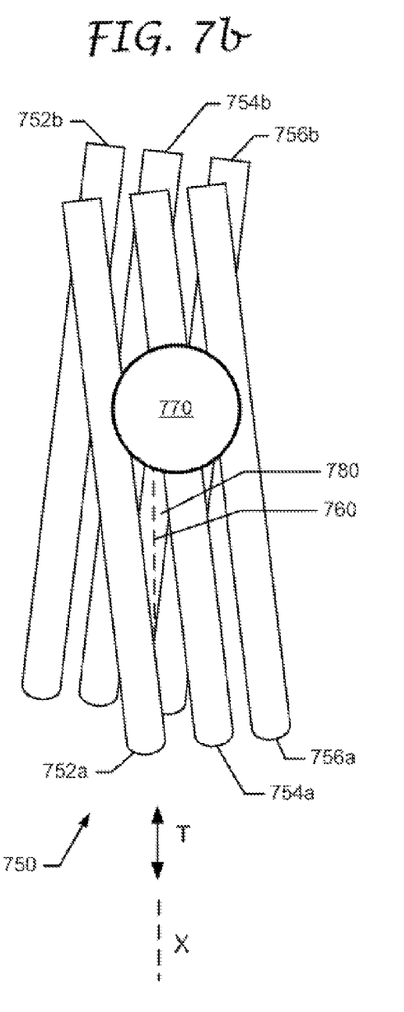
FIG. 7b is an illustration of reinforcing fibers oriented at ±α degrees with respect to an axis of primary loading of a stringer with a hole drilled in the middle.

Reference is now made to FIGS. 7a and 7b, which illustrate how the ply splitting is suppressed or delayed. FIG. 7a illustrates a single ply 710 having six fibers 712 to 717 embedded in a matrix 720. The fibers 712 to 717 are oriented at 0 degrees with respect to the X-axis. Fibers 714 and 715 are cut by drilling a hole 730. When a tensile load T is applied along the X-axis, the uncut fibers 712, 713, 716 and 717 carry the load and stretch. The cut fibers 714 and 715 do not carry the load, do not stretch, and are sheared away from the matrix 720. This, in turn, weakens the resin between a cut fiber 714 and an uncut fiber 713. A slender crack 740 (represented by the dash line) forms in the matrix 720 between the cut and uncut fibers 714 and 713. This crack 740 can propagate along the entire length of the ply 710. The crack 740 can occur whether a structure has one ply, five plies, tens plies, or more. The crack 740 severely degrades the strength of the stringer.

FIG. 7b illustrates a layer 750 of fibers 752a to 756a oriented at −α degrees with respect to X-axis, and fibers 752b to 756b oriented at +α degrees with respect to the X-axis, where α is between 2 and 12 degrees. The layer 750 may include a single ply having fibers 752a to 756a and 752b to 756b or two unidirectional plies (one unidirectional ply having fibers 752a to 756a and another unidirectional ply having fibers 752b to 756b). If fibers 754a, 756a, 754b and 756b are cut by a hole 770, a small crack 780 will form in the layer 750. However, the crack 780 will not grow in an uncontrolled manner. Instead, growth of the crack 780 will slow and promptly stop, whereby strength of the stringer is retained. Moreover, due to the fiber orientation of α between 2 and 12 degrees, an ever increasing load will be needed to propagate the crack 780 (the angled fibers have been shown to diffuse the energy at the crack tip). Ply splitting is thus suppressed or delayed.

An angle α in the range of 2 to 8 degrees provides a good combination of strength and splitting suppression. For angles below 2 degrees, ply splitting increases rapidly. For angles α exceeding 8 degrees, axial strength drops off quickly. However, for some applications, angles up to 12 degrees will provide acceptable strength.

In some embodiments, an angle α in the range of 3 to 5 degrees provides a better combination of strength and splitting suppression/delay, and it also provides a margin of error against strength drop-off which can occur below α=2 degrees and above α=8 degrees (if fiber control is insufficient during fabrication, some fibers might be oriented at angles less than 2 degrees or greater than 8 degrees). An angle α of 3 degrees has been found to provide an even better combination, as it provides 1 to 2% more strength in compression.

The fibers may be balanced or slightly unbalanced. As an example of balanced fibers, a stringer has N plies of fibers at +α interspersed with N plies of fibers at −α. As an example of slightly unbalanced fibers, a stringer may have N plies of fibers at +α interspersed with N−1 plies of fibers at −α degrees.

In some embodiments, all plies may have the same value of +α and the same value of −α. In other embodiments, the plies may have different values of α. For instance, plies of reinforcing fibers having orientations of α=3 degrees and α=5 degrees may be laid up.

In some embodiments, a ply may have fibers at different angles. For example, a ply may include fibers oriented at angles of −3 degrees, +7 degrees, −7 degrees, and +2 degrees. In some embodiments, a ply may have fibers oriented at both angles +α and −α degrees.

The optimal value of α will usually be a function of several factors. These factors include, but are not limited to, the fiber, the matrix, interface bonding strength between a fiber and the matrix, fiber density, fiber length, etc. These factors also include the ability to control fiber orientation.

The composite stiffeners have been described above in connection with an aircraft. However, composite stiffeners herein are not so limited. Composite stiffeners herein may provide stiffness for structures of helicopters, spacecraft, and other aerospace vehicles. Composite stiffeners herein are not even limited to aerospace vehicles. They can be used in any lightweight structure that requires stiffening.

The invention claimed is:

1. A composite laminate comprising a plurality of plies of reinforcing fibers; at least some of the plies having reinforcing fibers oriented at ±α with respect to an axis of primary loading, where α is between 2 and 12 degrees; at least some of the plies having reinforcing fibers oriented at ±β with respect to the axis of primary loading, where β is between 50 and 85 degrees.

2. The laminate of claim 1, wherein α is between 2 and 8 degrees.

3. The laminate of claim 1, wherein α is between 3 and 5 degrees.

4. The laminate of claim 1, wherein the reinforcing fibers oriented at ±α constitute at least 50% of the total number of fibers.

5. The laminate of claim 1, further comprising a polymer matrix, wherein the fibers include carbon fibers in a polymer matrix.

6. The laminate of claim 1, wherein all fibers in the laminate consist of the fibers oriented at ±α and ±β; and wherein 20-30% of the total fibers are oriented at ±β to reach bearing strength levels similar to traditional 0/+45/−45/90 degree hard laminates.

7. A system comprising the laminate of claim 1.

8. A composite beam comprising plies of α-reinforcing fibers oriented at ±α with respect to an axis of primary loading, where α is between 2 and 12 degrees; and plies having β-reinforcing fibers oriented at ±β with respect to the axis of primary loading, where β is between 50 and 85 degrees.

9. The beam of claim 8, including a base and a web, at least one of the base and web including the plies of the α-reinforcing and the plies of the β-reinforcing fibers, at least 50% of the reinforcing fibers being the α-reinforcing fibers.

10. The beam of claim 8, wherein the base has fastener apertures, whereby the α-reinforcing fibers in the base are oriented at ±α degrees to suppress or delay splitting caused by the fastener apertures.

11. The beam of claim 8, wherein α is between 2 and 8 degrees.

12. The beam of claim 8, wherein α is between 3 and 5 degrees.

13. The beam of claim 9, wherein the β-reinforcing fibers are biased towards outer surfaces of the webs to increase stiffness in buckling and transverse bending.

14. The beam of claim 8, further comprising a polymer matrix; wherein the α-reinforcing and the β-reinforcing fibers include carbon fibers embedded in the polymer matrix.

15. A system comprising the beam of claim 8.

16. A system comprising a beam including a base and a web, the web including plies of reinforcing fibers for providing strength in tension and compression along an axis of primary loading, the web also including plies of reinforcing fibers oriented at ±β degrees with respect to the axis of primary loading, where β is between 50 and 85 degrees, wherein the fibers oriented at ±β degrees are biased towards outer surfaces of the web to increase stiffness in buckling and transverse loading.

17. The system of claim 16, wherein the reinforcing fibers for providing strength in tension and compression are oriented at ±α with respect to the axis of primary loading, where α is between 2 and 12 degrees.

18. The system of claim 16, wherein the reinforcing fibers are carbon fibers embedded in a polymer matrix.

19. The system of claim 16, wherein the reinforcing fibers oriented at ±β degrees are biased towards an outer surface of the web to increase stiffness in buckling and transverse bending.

20. The system of claim 16, wherein α is between 3 and 5 degrees.

* * * * *